April 5, 1966
M. V. BLAKE
3,244,382
APPARATUS OPERATIVE WHEN A PREDETERMINED
RATE OF MOVEMENT OCCURS
Filed July 5, 1963
2 Sheets-Sheet 1
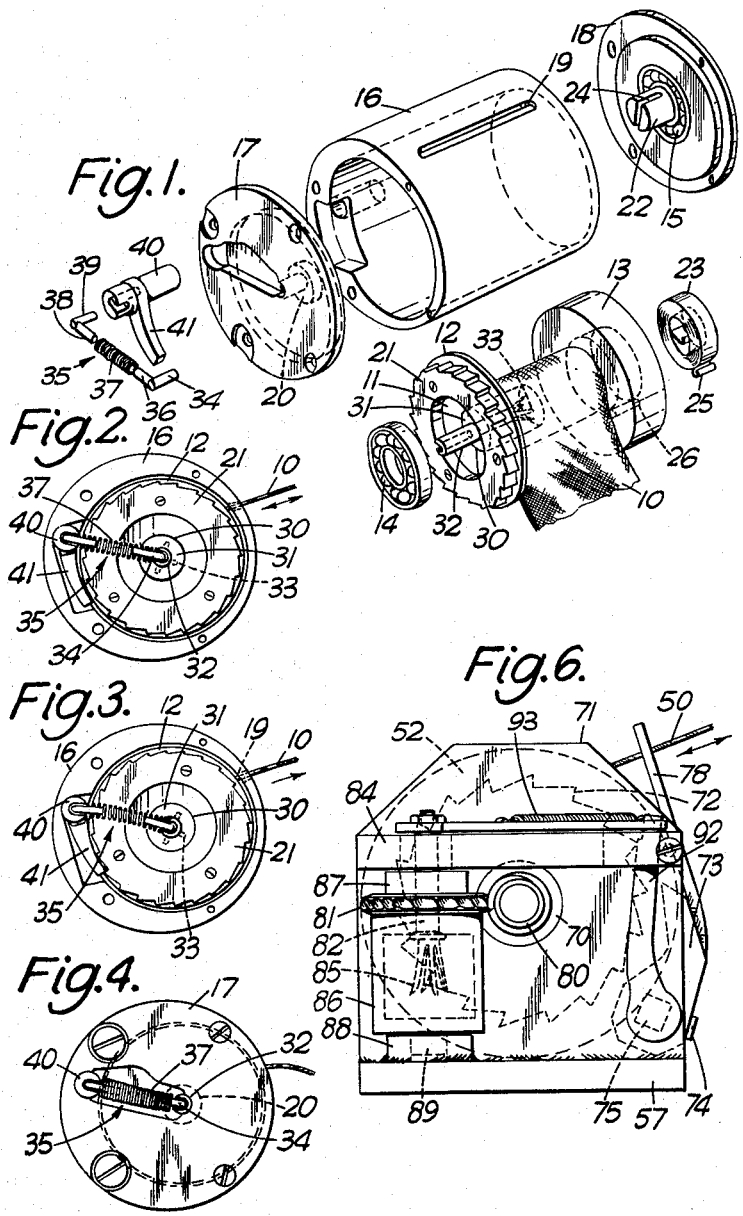
INVENTOR
MINDEN VAUGHAN BLAKE
BY Mawhinney & Mawhinney
ATTYS.

April 5, 1966  M. V. BLAKE  3,244,382
APPARATUS OPERATIVE WHEN A PREDETERMINED
RATE OF MOVEMENT OCCURS
Filed July 5, 1963  2 Sheets-Sheet 2
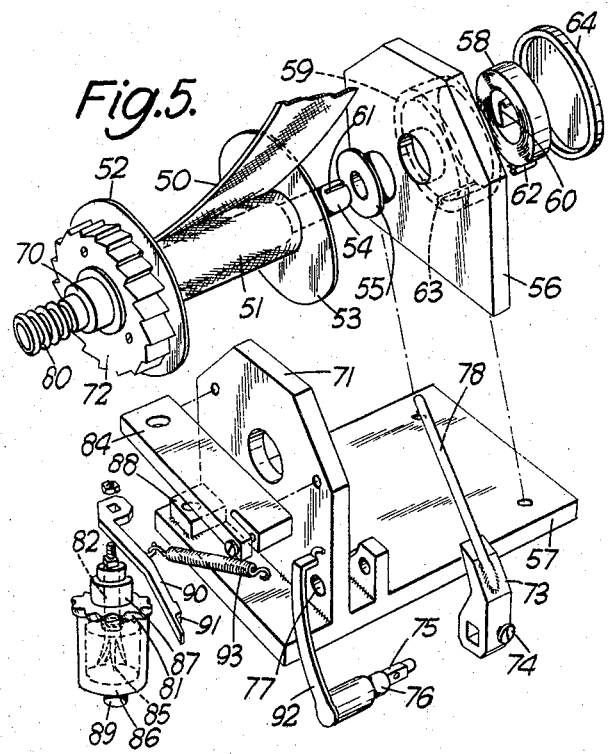
INVENTOR
MINDEN VAUGHAN BLAKE
BY Mawhinney & Mawhinney
ATTYS.

3,244,382

APPARATUS OPERATIVE WHEN A PREDETERMINED RATE OF MOVEMENT OCCURS

Minden Vaughan Blake, "Carnanton," Woodlands Road E., Virginia Water, England

Filed July 5, 1963, Ser. No. 293,122
Claims priority, application Great Britain, July 6, 1962, 26,078/62
8 Claims. (Cl. 242—107.4)

This invention relates to apparatus operative when a predetermined rate of movement occurs and more particularly to apparatus for operating a mechanism, for example a locking mechanism, when said predetermined rate is exceeded. The apparatus of the present invention finds particular application for resulting a sudden pull.

The invention makes use of visco-elastic material which has the property that it can flow readily when subjected to relatively small stresses but which, when the rate of shear reaches a certain value, gives an increased resistance to shearing stresses. More particularly the invention makes use of a silicon material known as "bouncing putty" which can flow readily when subjected to small stresses but which gives a very great increase in resistance to shearing forces when the rate of shear exceeds a certain value.

The invention is particularly applicable to safety straps in cars and aircraft. Here freedom of movement is desirable except when the wearer of the strap is subjected to the forces arising on a crash retardation of the vehicle; the strap must then hold fast under high stresses. It has previously been proposed to provide mechanical means which would enable the wearer to move forward slowly but which would lock against a sudden pull. Such mechanical arrangements, however, are relatively complex and are not entirely foolproof.

According to one aspect of the present invention, apparatus operative when a predetermined rate of relative movement occurs to prevent further movement comprises two relatively rotatable elements with visco-elastic material between them so that the visco-elastic material is put in shear when the elements rotate relative to one another and means for effecting relative rotation of said elements in accordance with said relative movement. When the predetermined rate of relative movement is reached, the resistance to shear increases and hence the two elements will tend to rotate together but below this speed the resistance to shear is small and the two elements can freely rotate relative to one another. If the motion were applied to one of the elements and the other was fixed, the visco-elastic material would provide an increased resistance to motion when the predetermined speed is reached. Preferably however there are provided spring means tending to hold the other of said elements in a fixed position and means responsive to movement of the other of said elements against the spring force arranged to lock said one element, for example by causing a pawl to engage a ratchet.

According to another aspect of the invention, apparatus for operating a mechanism, e.g. a servo mechanism, when a predetermined rate of movement is reached comprises two relatively rotatable elements with visco-elastic material between them so that the visco-elastic material is put in shear when the elements rotate relative to one another, means for rotating one of said elements in accordance with said movement and an operating member responsive to movement of said other element.

As previously indicated, the apparatus of the present invention finds particular application for resisting a sudden pull and, according to a further feature of the invention, apparatus for resisting a sudden pull comprises a member to which the pull is applied, two relatively rotatable elements with bouncing putty between them so that the bouncing putty is put in shear when the elements rotate relative to one another, and means connecting said member to effect rotation of one of said elements when a pull is applied to said member. The bouncing putty will increase in viscosity when subjected to a sudden shearing force due to a sudden pull on said member; the two relatively rotatable elements would thereby be prevented from rotating relatively to one another. Movement of the member would be resisted if the other element, that is to say the element not connected to said member, is held in a fixed position. As soon as the sudden stress is released however, it begins to give slowly. Thus with the arrangement described above the drum can rotate slowly but cannot rotate quickly. In applying the apparatus to the mounting of a car or aircraft safety strap, the device may be mounted on the vehicle to carry one or other end of a safety strap which is wound around the drum. The strap can be partially unwound from the drum by a steady slow pull and stretched around the wearer, the free end being fixed to a suitable anchorage in any convenient manner. The device permits of the strap being unwound slowly but, on any sudden pull on the strap, the drum is locked against rotation by the bouncing putty.

Preferably said other element is not rigidly fixed but there are provided spring means tending to keep it in one position and a locking mechanism for locking said member against further motion in at least one direction, which mechanism is operated by movement of said other element. For a vehicle safety strap in which the strap is wound on a drum, the locking mechanism may comprise a pawl and ratchet for permitting rotation of the drum in the direction to wind the strap, the pawl being brought into engagement with the ratchet by movement of said other element either directly by movement of the other element or by a trigger mechanism. The use of a trigger mechanism, with the necessity of re-setting before the strap is again released for movement may be desirable in some cases when it is required, in the event of any sudden pull on the strap, to ensure that it is held firmly despite any subsequent temporary release of the load on the strap.

The invention also includes within its scope apparatus for locking a member when its rotational speed exceeds a predetermined value, a chamber containing bouncing putty, an element rotatable relative to said chamber in the bouncing putty and means connecting said member to effect relative rotation between said chamber and said element when said member rotates, said element and chamber being arranged so that the bouncing putty is put in shear by relative rotation of the chamber and element.

The chamber may be rotated by said member and said element spring loaded so as normally to remain in a fixed position but to be deflected against the spring force when said predetermined speed is reached and a locking mechanism provided for locking said member against further motion in at least the direction of the aforementioned rotation, which mechanism is operated by deflection of the element against the spring force. Alternatively the element may be rotated by said member and the chamber spring loaded, the locking mechanism being operated in this case by the chamber.

The aforesaid member may be a drum on which is wound a flexible member, e.g. a car safety strap, and in this case the locking mechanism conveniently comprises a pawl and ratchet for locking the drum against rotation. The drum in such an arrangement may be spring loaded to tend to rotate in the direction to wind the flexible member on the drum. Considering a car safety strap, it will be seen that, with this arrangement, if the strap is pulled slowly, the drum will rotate. On any sudden pull on the strap, however, the locking mechanism is operated by the bouncing putty to lock the drum so that the strap is held firm against any sudden pull. The apparatus can be used by pulling out the strap slowly to the original length and fastening it in position around the user. Considering a car seat, if the user wishes to lean forward, he can lean forward slowly and the strap will gradually unwind by rotation of the drum. Any sudden jolt however tending to throw the wearer forward will be resisted as the strap will not unwind any further because of the locking mechanism locking the drum. If, after leaning forward, the wearer should lean back again, the strap will automatically rewind on the drum due to the spring loading of the drum.

The invention furthermore includes within its scope apparatus for resisting a sudden pull comprising a flexible member, a drum on which the flexible member is wound, which drum is rotatably carried in a mount, and a chamber containing bouncing putty arranged between a fixed member and a surface of said drum, or of a member rotated by it with the drum, or that the bouncing putty is subjected to shear when the drum is rotated by a pull on said flexible member.

Although the device has been more particularly described in its application to a safety strap for a car or aircraft, it will readily be apparent that it may be used for any other device where it is required to operate a mechanism, for example, a lock, a brake or alarm system when a certain speed of movement has been reached.

The following is a description of two embodiments of the invention, reference being made to the accompanying drawings in which:

FIGURE 1 is an exploded view of an apparatus for resisting a sudden pull on a car safety strap;

FIGURES 2 and 3 are views of one end of the apparatus of FIGURE 1 with the cover plates removed and showing the apparatus in two different conditions of operation;

FIGURE 4 is an end view of the apparatus of FIGURE 1 with the cover plate in position;

FIGURE 5 is an exploded view of another form of apparatus for resisting a sudden pull on a car safety strap; and FIGURES 6 and 7 are end views of the apparatus of FIGURE 5 in two different conditions of operation.

Referring to FIGURES 1 to 4, the apparatus illustrated holds one end of a car safety strap, e.g. a belt or shoulder strap, which has to resist a sudden pull. This end of the strap is shown at 10 and is wound on a drum 11 having two end plates 12, 13. The drum 11 is rotatable in bearings 14, 15, in a fixed mount comprising a cylindrical housing 16 with end cover plates 17, 18 the strap 10 passing out through a slot 19 in the housing 16. The bearings 14, 15 in the construction illustrated are ball bearings. The bearing 14 is carried on a spigot 20 on the cover plate 17 and lying within an annular ratchet wheel 21 bolted to the end plate 12 of the drum. The bearing 15 is carried on a spigot 22 on the cover plate 18 and fits within the end plate 13 of the drum 11. The drum 11 is spring loaded in the direction to wind the strap 10 onto the drum by means of a spirally wound spring 23, the inner end of which is anchored by passing into a slot 24 in the aforementioned spigot 22 on cover plate 18. The outer end of the spring is turned over as shown at 25 and fits into a recess 26 in the inner surface of the end plate 13.

Within the drum 11 at one end thereof is a cylindrical chamber 30 containing bouncing putty 31. This chamber 30 is co-axial with the axis of the drum and its open end is closed by the aforementioned spigot 20 through which passes a shaft 32 carrying a stirrer 33 in the bouncing putty 31. At its outer end, the shaft 32 is hollow to receive one arm 34 of an L-shaped member forming part of a link 35, the other arm 36 of this L-shaped member being secured in one end of a helical coil spring 37. The arm 36 extends through a slot in the shaft 32 so that the link 35 is keyed to the shaft 32. To the other end of the spring 37 is secured one arm 38 of a second L-shaped member having a second arm 39 which fits in a bore in one end of a short shaft 40 carrying a pawl 41 co-operating with the aforementioned ratchet wheel 21. The arm 38 passes through a slot in the shaft 40 so that the arm 39 is keyed to this shaft.

Normally the spring 37 remains straight as shown in FIGURES 2 and 4 and, in this condition, the pawl 41 is clear of the teeth of the ratchet wheel so that the latter, and hence the drum 11 can rotate freely when the strap 10 is pulled outwards slowly. When the strap is pulled slowly, the bouncing putty 37 in the chamber 30 can rotate despite the presence of the stirrer 33. If, however, a sudden pull is applied to the strap 10, the properties of the bouncing putty are such that it locks solid onto the stirrer 33 and relative rotation of the putty with respect to the stirrer and hence of the drum 11 with respect to its mount is prevented. If the stirrer 33 were fixed, the resistance of the putty 31 to shear on application of a sudden pull would prevent rotation of the drum. In the construction shown in FIGURES 1 to 4 however, when a sudden pull is applied to the strap 10, the stirrer 33 tends to rotate very slightly with the drum so bending the link 35 as shown in FIGURE 3. This brings the pawl 41 into engagement with the ratchet wheel 21 and so gives a mechanical lock against any further rotation of the drum and hence prevents the strap 10 from unwinding further.

It will be seen that the apparatus of FIGURES 1 to 4 may be used to hold one end of a safety strap, the other end of which is secured to a fixed anchorage, for example by having a hook or clip adapted to engage a suitable anchorage point on the vehicle structure or one end of a further strap of which the other end is anchored. The strap may be unwound from the drum 11 by pulling slowly on the strap against the tension of spring 23. When the strap is in position around the body of the wearer, it will be kept taut by this spring. The wearer can lean forward and the strap will unwind as necessary from the drum, unwinding under the spring force when the wearer leans back. On any sudden pull, however, the action of the bouncing putty 31 causes the pawl 41 to engage the ratchet wheel 21 thereby locking the drum 11 and preventing unwinding of the strap 10.

Another embodiment of the invention is illustrated in FIGURES 5 to 7. In this construction, a strap 50 is wound on a drum 51 having end plates 52, 53. At one end the drum 51 is rotatably supported by a stub shaft 54 carried in a bush 55 fixed in an upright mounting plate 56 on a base 57. A spirally coiled spring 58 housed in a recess 59 in the outer surface of the plate 56 has its inner end 60 in a transverse slot 61 in the shaft 54 and its outer end is turned over as shown at 62 to engage a slot 63 in the wall of the recess 59. The spring 58 tends to turn the drum 51 in the direction to wind the strap 50 onto the drum. A cap 64, which is a push-fit in the recess 59, forms a cover for the spring.

At the end remote from the spring 58, the drum is rotatably supported by means of a bush 70 in an upright plate 71 on the base 57. Secured to the end plate 52 is a ratchet wheel 72 with which co-operates a pawl 73 which is secured by a set screw 74 on a square section portion 75 of a shaft 76. This shaft 76 passes through and is rotatable in an aperture 77 in the plate 71.

A lever arm 78 is secured to the pawl 73 for manually moving the pawl out of engagement from the ratchet wheel when necessary, as described later. The drum 51 also carries a worm 80, in this particular embodiment a single start worm, which engages a worm wheel 81 freely rotatable on a vertical shaft 82. This shaft is rotatable in a bush 83 in a horizontal support 84 bolted to the aforementioned plate 31. The lower end of the shaft 82 carries a stirrer 85 within a cylindrical chamber 86 containing bouncing putty. The chamber 86 is secured to the worm wheel 81 and conveniently is formed integrally therewith as a single moulding of plastics material. The chamber 86 is rotatable about its axis, which is coincident with the axis of the shaft 82, being supported for this by a boss 87 on the worm wheel 81, which boss is rotatable freely on the shaft 82, and by a spigot 88 at the bottom of the chamber in a bearing plate 89.

Keyed to the shaft 82 is a trigger arm 90 having a shoulder 91 adapted to engage an arm 92 which is secured to the aforementioned shaft 76. A helical coil tension spring 93 between the arms 90, 92 serves normally to hold the arm 92 against the shoulder 91 and, in this condition, the arm 92 holds the pawl 73 out of engagement with the ratchet wheel 72.

The apparatus of FIGURES 5 to 7 is used to hold one end of a car safety strap, the other end of which is secured to a fixed anchorage or secured to one end of another strap the other end of which is anchored. In normal operation, the pawl 73 is out of engagement. In this condition, the strap 50 can be unwound from the drum, against the force of spring 58, by pulling it slowly. The rotation of the drum 51 will turn worm 80 and hence will rotate the worm wheel 81 and the chamber 86 containing the bouncing putty. This will not impede slower rotation of the drum and choice of the gear ratio of gearing 80, 81 enables the required speed of unwinding to be obtained with only very slow rotation of the chamber 86 relative to the stirrer 85. The user can thus withdraw the length of strap necessary for fastening around the body and the strap is held taut by the tension of spring 58. When the strap is secured in position, the wearer can lean forward, the strap unwinding as necessary from the drum 51 and, when subsequently leaning back, the slack is taken up by the spring 58 rewinding the tape on the drum. In the event of a sudden pull, however, the action of the bouncing putty locks the stirrer 85 to the chamber 86 so that the stirrer tends to rotate. Very slight movement of the stirrer 85 moves the arm 90 sufficiently to disengage the shoulder 91 from the arm 92 and the spring 93 then pulls the arm 92 in the direction to bring the pawl 73 into engagement with the ratchet wheel 72. The pawl is held in engagement by the spring 93 and locks the drum against further rotation so preventing any unwinding of the strap 50. It will be noted that in this arrangement, as in that of FIGURES 1 to 4, a pawl provides a positive locking mechanism preventing rotation of the drum so soon as sufficient shear force is applied to the bouncing putty to cause the stirrer to turn through a small angle.

In the trigger-operated apparatus of FIGURES 5 to 7, on release of the pull of the strap 50, the pawl 73 remains in engagement with the ratchet wheel. Thus the strap 50 is not released on any temporary cessation of the pull on the strap such as might occur if there was any oscillating motion. The strap can readily be released manually by the aforementioned lever arm 78 which is moved to disengage the pawl 73 and which will also re-set the trigger mechanism by moving back the arm 92 so that the spring 93 pulls the arm 90 into the position where the shoulder 91 will be engaged by the arm 92 as soon as the lever arm 78 is released.

In each of the above described constructions, the rewind of the strap under the spring force has to be slow because relative movement takes place between the stirrer and the chamber containing the bouncing putty or rewind. For a car safety strap this is quite acceptable. It would be readily possible however to permit of fast rewind by providing a one-way drive, e.g. a pawl and ratchet device between the stirrer 33 and link 35 of FIGURES 1 to 4 or in the drive between the drum 51 and chamber 86 of FIGURES 5 to 7.

Although in the construction shown, the bouncing putty is put in a cylindrical chamber containing a stirrer, it will be appreciated that there are may possible constructions for putting this material in shear, for example it might be arranged in a container between two relatively rotatable members having surfaces not normal to the axis of relative rotation. The particular form of stirrer shown in the drawings puts the putty in shear at a number of separate points and this is generally desirable. It will be readily apparent however, that this can be achieved with many other constructions of paddle or stirrer.

I claim:
1. Apparatus for resisting a sudden pull in one direction on a flexible member comprising a housing, a drum on which the flexible member is wound, mounted in the housing, first and second rotatable elements mounted in the housing and arranged to engage bouncing putty located between them to be in shear between said elements whereby said elements tend to rotate together in conditions when the resistance to shear of the bouncing putty is increased, said drum being connected to drive said first rotatable element, a pawl mounted in the housing and a ratchet for locking the drum against rotation in the direction for unwinding the flexible member, and means, responsive to rotational movement of the second element occurring when the rate of relative rotation between said first and second elements reaches a predetermined value at which the resistance to shear of the bouncing putty is increased, arranged to move the pawl into engagement with the ratchet on movement of said second element.

2. Apparatus as claimed in claim 1, wherein said drum is loaded by a spring which engages said housing and which is arranged so that the drum tends to rotate in the direction to wind the flexible member on to the drum.

3. Apparatus for resisting the rotation of a rotatable element in one direction when a predetermined rate of rotation of said element in said one direction is reached, comprising a support for said rotatable element, a second element movably mounted in the support, silicone bouncing putty being arranged between and engaged by said rotatable element and said second element to be in shear between said elements whereby said elements tend to move together in conditions when the resistance to shear of the silicone bouncing putty is increased, means for rotating said rotatable member, a locking means responsive to movement of said second element, said movement occurring when the rate of relative movement between said elements reaches a predetermined value at which the resistance to shear of the putty is increased, said locking means being operative to lock said rotatable element against rotation.

4. Apparatus for resisting a sudden pull on a member, comprising a housing, first and second rotatable elements mounted in the housing and engaging silicone bouncing putty located between them to be in shear between said elements whereby said elements tend to rotate together in conditions when the resistance to shear of the bouncing putty is increased, means connecting said member to said first rotatable element to effect rotation of said first rotatable element when a pull is applied to said member, spring means in said housing tending to keep said second rotatable element in a fixed position, a locking means responsive to movement of said second rotatable element against the action of said spring means, said movement occurring when the rate of relative rotation between said first and second rotatable elements reaches a predetermined value at which the resistance to shear of the bouncing putty is increased, said locking means being operative to lock said first rotatable element against rotation.

5. Apparatus for resisting a sudden pull in one direction on a member comprising a support, first and second rotatable elements mounted in the housing and engaging silicone bouncing putty located between said elements, to be in shear between said rotatable elements whereby said elements tend to rotate together in conditions when the resistance to shear of the bouncing putty is increased, means for effecting rotation of said first rotatable element when a pull is applied to said member, spring means in said housing tending to keep said second rotatable element in one position, trigger released locking means arranged to lock said member against movement in said direction, and means, responsive to movement of said second rotatable element occurring when the rate or relative rotation between said first and second rotatable elements reaches a predetermined value at which the resistance to shear of the bouncing putty is increased, arranged to trigger said locking means.

6. Apparatus for resisting rotation in one direction of a rotatable element when a predetermined rate of rotation of said element in said direction is reached, comprising a housing for said rotatable element, a drum rotatably mounted in said housing and having a chamber containing silicone bouncing putty, a second rotatable element extending into said chamber and engaging said putty, whereby said putty is in shear between said chamber and said second rotatable element whereby said chamber and said second rotatable element tend to rotate together in conditions when the resistance to shear of the bouncing putty is increased, said first rotatable element being drivingly connected to said drum to rotate said chamber with said first rotatable element, spring means arranged to tend to keep said second rotatable element in a fixed position, a locking means responsive to movement of said second rotatable element against the action of said spring means, said movement occurring when the rate of relative rotation between said chamber and said second rotatable element reaches a predetermined value at which the resistance to shear of the bouncing putty is increased, said locking means being operative to lock said first rotatable element against rotation in the said direction.

7. Apparatus for resisting a sudden pull in one direction on a flexible member comprising a housing, a drum on which the flexible member is wound, which drum is rotatably mounted in the housing and carries a ratchet wheel, a drum having a chamber containing silicone bouncing putty, a pawl mounted on the housing, said pawl and ratchet wheel when engaged permitting the drum to turn in the direction to wind the flexible member onto the drum but preventing the drum rotating in the opposite direction, spring means normally holding the pawl out of engagement with the ratchet, an element extending into and engaging the said putty, so that the putty is in shear between said chamber and said element, whereby said chamber and element tend to rotate together in conditions when the resistance to shear of the putty is increased, said element being arranged, when rotated when the rate of relative rotation between said chamber and said element reaches a predetermined value at which the resistance to shear of the putty is increased to force said pawl against the force of said spring into engagement with the ratchet wheel.

8. Apparatus for resisting a sudden pull in one direction on a flexible member, comprising a support, a drum on which the flexible member is wound, which drum is rotatably mounted in the support and carries a ratchet wheel, a pawl mounted on the support, the pawl and ratchet being arranged so that their engagement prevents rotation of the drum in said direction, a member having a chamber therein rotatably mounted on the support and arranged to be driven by said drum, which chamber contains silicone bouncing putty, a rotatable element mounted in the housing and having a portion extending into the chamber to engage said putty, so that the putty is in shear between said chamber and said element, whereby said chamber and element tend to rotate together in conditions when the resistance to shear of the putty is increased, trigger released means arranged to be operated by movement of said rotatable element occurring when the rate of relative rotation between said chamber and said element reaches a predetermined value at which the resistance to shear of the putty is increased, said trigger released means being arranged to force the pawl into engagement with said ratchet.

References Cited by the Examiner

UNITED STATES PATENTS

| | | |
|---|---|---|
| 2,705,631 | 4/1955 | Reichold. |
| 2,775,317 | 12/1956 | Sinisterra _____ 188—101 X |
| 2,843,335 | 7/1958 | Hoven et al. _____ 242—107.4 |
| 2,923,549 | 2/1960 | Hopper et al. |
| 3,058,687 | 10/1962 | Bentley _____ 242—107.4 |

OTHER REFERENCES

Product Engineering, October 1953, pages 142, 143, "Silicone Putty For Slip Clutches and Couplings."

MERVIN STEIN, *Primary Examiner.*

W. S. BURDEN, *Assistant Examiner.*